Figure 1:
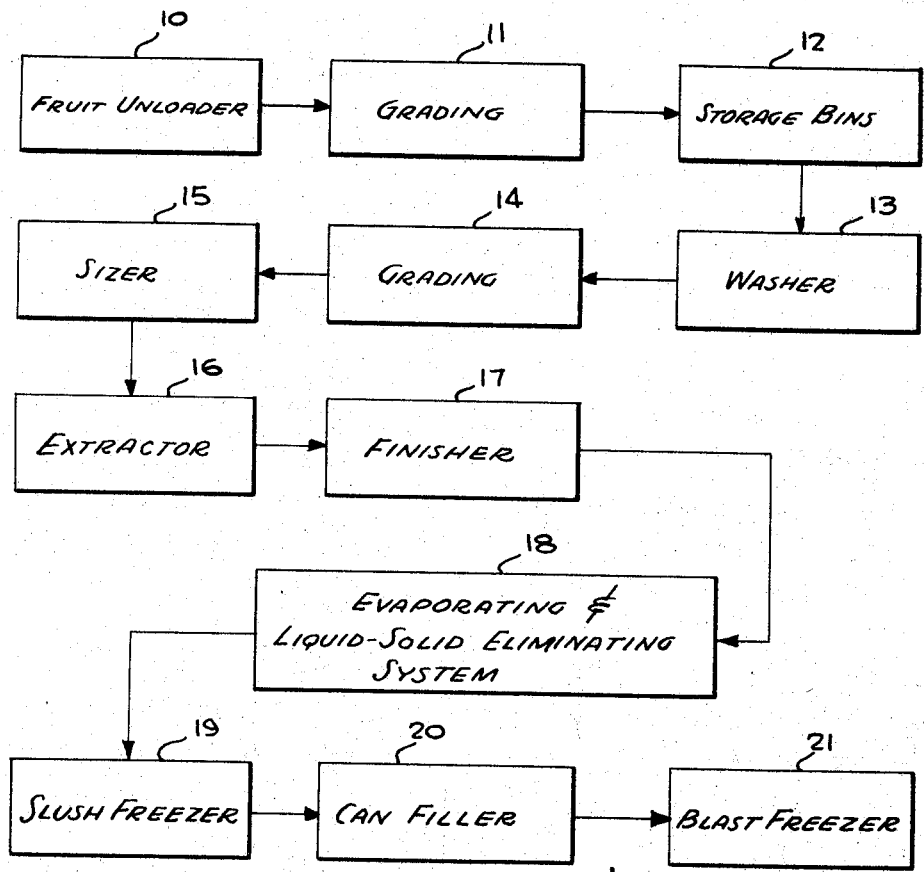

Jan. 9, 1968    J. F. KING, JR., ET AL    3,362,456
APPARATUS FOR SPRAY CONCENTRATING FRUIT JUICE
Filed April 8, 1965                                3 Sheets-Sheet 1

INVENTORS
JAMES F. KING, JR. &
MAURICE W. HOOVER
BY Mason, Fenwick & Lawrence
ATTORNEYS

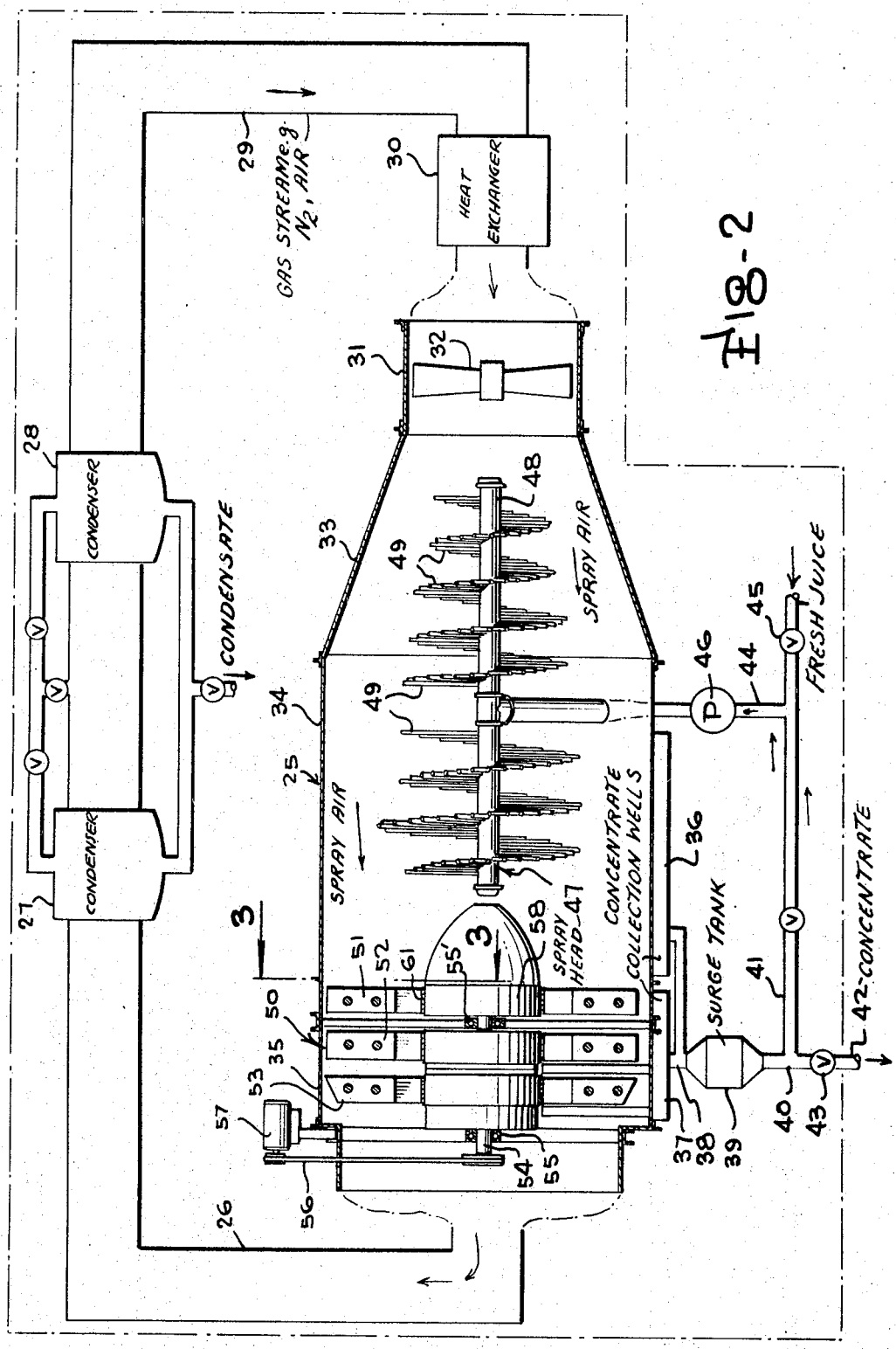

INVENTORS
JAMES F. KING, JR. &
MAURICE W. HOOVER
BY
Mason, Fenwick & Lawrence
ATTORNEYS

United States Patent Office 3,362,456
Patented Jan. 9, 1968

3,362,456
APPARATUS FOR SPRAY CONCENTRATING
FRUIT JUICE
James Frank King, Jr., 1001 S. Marshall St., Winston-Salem, N.C. 27101, and Maurice W. Hoover, Raleigh, N.C.
Filed Apr. 8, 1965, Ser. No. 446,496
7 Claims. (Cl. 159—4)

The present invention relates in general to methods and apparatus for concentrating fruit juices, such as orange juice and the like, and more particularly to a process and apparatus for eliminating water from fruit juice to effect concentration of the same for commercial distribution, wherein water is extracted from the juice by spraying the juice in very small droplet size into a moving air or gaseous stream which extracts water constituents from the juice through evaporation, the liquid and solid state juice constituents being physically separated from the air or gaseous stream for delivery along a selected recovery path.

Heretofore, considerable effort has been devoted to development of improved processes for increasing the quality of concentrated fruit juice, such as orange juice. Prior art processes involving use of vacuum evaporators operating at the usual temperature for such devices have been found to result in considerable flavor damage during concentration. While much of this temperature-caused damage may be eliminated if the temperature during evaporation is lowered to 60°–80° F., the product produced by such prior art methods was found to still lack the flavor of fresh juice when reconstituted, due probably to the substantial loss during concentration of volatile fractions, especially peel oils, contributing to the aroma and flavor of the product. Efforts to recover volatile constituents lost during evaporation and return them to the concentrate to enhance the flavor have not been successful. The most prevalent method heretofore adopted in the industry to attempt to restore these lost flavor-producing constituents has been to add fresh juice, called "cut-back," to the concentrate after concentrating juice through one or more evaporator stages. This, of course, complicates the juice processing procedure and apparatus line due to the added processing steps involved in handling the "cut-back" juice and introducing the same in the concentrate.

An object of the present invention is the provision of a novel process and apparatus for concentrating fruit juice, such as orange juice and the like, wherein water is extracted from the fruit juice in a manner minimizing loss of natural oils and other constituents which contribute to the distinct flavor of the natural juice.

Another object of the present invention is the provision of a novel process and apparatus for concentrating fruit juice, such as orange juice and the like, wherein the juice is discharged in as small a droplet size as possible into a moving stream of air or inert gas to effect evaporation of water from the juice into the moving stream to saturate the latter and a plurality of rotating eliminator surfaces are driven through the saturated stream to efficiently remove from the stream liquid any solid state particles entrained in the stream and collect the same as juice concentrate.

Another object of the present invention is the provision of a novel process and apparatus for concentrating fruit juice wherein high productivity is achieved by saturating a high velocity dehydrated air or inert gas stream with water evaporated from fruit juice sprayed in minute droplet form into the stream and rapidly extracting or eliminating liquid and solid juice constituents entrained in the stream to form the juice concentrate.

Other objects, advantages and capabilities of the present invention will become apparent from the following detailed description, taken in conjunction with the accompanying drawings illustrating preferred embodiments of the invention.

Figure 3:
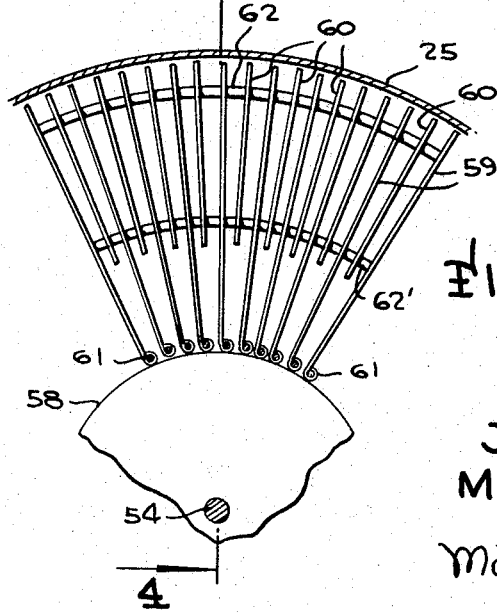
Figure 4:
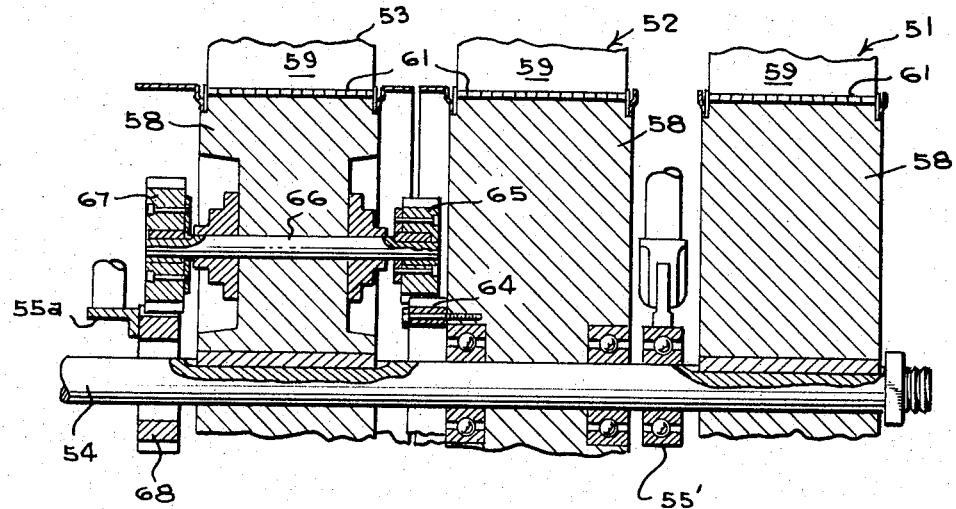
Figure 5:
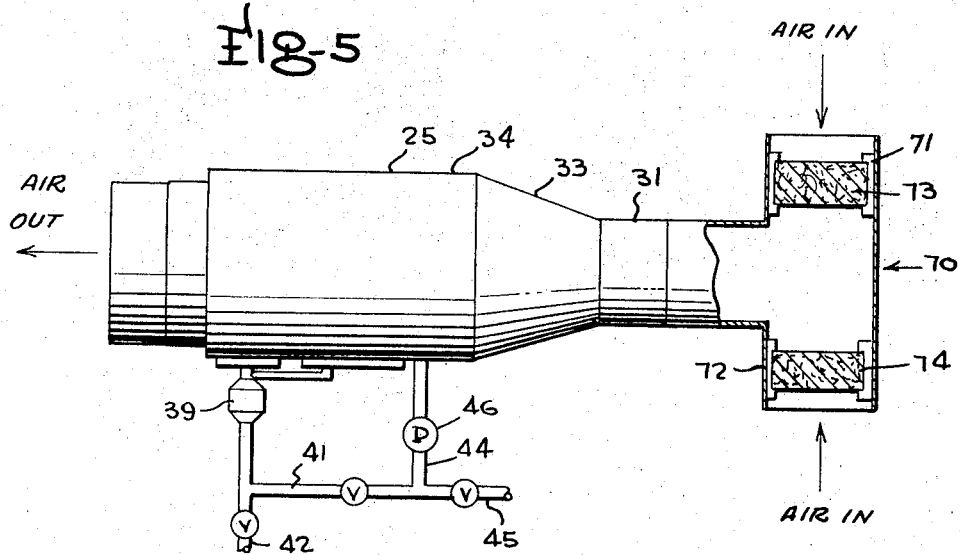

In the drawings:
FIGURE 1 is a flow diagram showing a complete set of process steps in the production of frozen concentrated fruit juice such as orange juice, including the evaporating and water eliminating step and apparatus of the present invention;
FIGURE 2 is a detailed diagrammatic view of systems embodying one form of the present invention wherein dried inert gas in circulated through a spray field of juice and liquid and solid constituents entrained with the gas are withdrawn by a rotary eliminator, the spraying and liquid-solid eliminating unit being shown in central longitudinal section with certain inner parts in elevation;
FIGURE 3 is a fragmentary section view of the rotary eliminator, taken along the line 3—3 of FIGURE 2;
FIGURE 4 is a diagrammatic section view of a drive system for a series of cascade eliminator wheels which may be used, taken from the position of line 4—4 in FIGURE 3;
FIGURE 5 is a diagrammatic view similar to FIGURE 1, showing another form of juice concentrating system wherein dried air is circulated through the spray field of juice and the liquid and solid entrained constituents are withdrawn by the rotary eliminator.

When the process and apparatus of the present invention are applicable to the concentration of fruit juices generally and especially citrus fruit juices, such as grapefruit, lemon, and lime juices, as well as grape and apple juices, the ensuing description will be directed to the preparation of frozen concentrated orange juice as a particular example of the invention. The novel spray evaporating and water eliminating features of the present invention to effect concentration of the fruit juice will be best understood by describing generally the complete series of steps employed in the production of frozen concentrated orange juice, followed by a specific description of the particular juice concentrating system of the present invention.

Referring to FIGURE 1 of the drawings illustrating a flow sheet of the steps in production of frozen concentrated orange juice, fruit is usually received at the plant in bulk in large trucks and the fruit is usually discharged by gravity unto conveyors, as indicated diagrammatically by the block 10, where the fruit is graded, as indicated by block 11, to remove broken, bruised or otherwise unsatisfactory fruit, and the selected fruit is elevated into storage bins as indicated by block 12. As soon as possible after harvest, usually within 24 hours, the fruit is withdrawn from the storage bins and washed, as indicated by the block 13, by immersion in water or spraying to wet the fruit and remove loose particles, followed by application of detergent, brushing, rinsing, and application of a germicide. Usually fruit from different bins, which has been previously analyzed for soluble solids and acids, is chosen and mixed in order to give a more uniform product, this being indicated by the grading and sizing blocks 14 and 15. The fruit is then delivered to extractors, as indicated by the block 16, which may be the same as those used in the preparation of juice for canning, from which juice is then passed to finishers, as indicated at 17, where pulp, seeds and rag are removed.

In conventional prior art processes the juice may either be then passed directly from the finisher 17 to the evaporator, or it may go to holding or blending tanks (not shown) where the juice is cooled somewhat and is available for further analysis and blending if desired, after which the juice is supplied through a heat exchanger to the evaporator. The evaporator in the conventional concentrating process may be any one of several prior art devices used to achieve juice concentration, which step is indicated by the block 18 in the flow diagram of FIGURE 1. Such evaporators customarily make use of falling-film heat exchangers, in which the juice runs in a thin film down the inside of a tube while the tube is gently heated from the outside to effect evaporation of water from the juice, all requiring substantial expenditure of energy due to the heat which must be provided to evaporate water from the juice and to dispose of the vapor phase water as by condensation. The application of heat to effect evaporation of water from the juice at commercially acceptable rates appears to be one of the significant factors which produces flavor damage during concentration.

When the juice is concentrated to a 55° to 63° Brix, the concentrate is then collected in a coldwall tank, as indicated by the block 19, where the temperature is held to 35° F. or below and the concentration is determined and corrections are made for temperature and citric acid content. In prior art processes involving addition of "cutback," cutback juice may be added at this point, and if the oil content is below the desired level, cold-pressed orange oil may be added. When the adjustments have been made for concentration, peel oil content, and acidity, the concentrate is further cooled in the coldwall tank to about 20–25° F. The concentrate is then fed to the cans and the cans sealed, as indicated by the block 20, and the cans are conveyed to a final freezing station, indicated by the block 21, where they are exposed to an air blast at about —40° F. or may be frozen by immersion in a refrigerated liquid mixture, following which the product is stored in a refrigerated storage space at 0° or less.

The process and apparatus of the present invention involves a novel system of juice concentration which is performed in the above-described production process at the stage indicated by the block 18. Instead of relying upon direct heat exchange with the fruit juice to effect evaporation in the usual manner achieved by conventional evaporators, condensation is achieved by spraying the juice into an enclosure in minute droplet form to effect evaporation of the water constituents into a high velocity inert gas or air stream until the stream attains a saturated or near saturated state, and rotating in the inert gas or air stream a rotary eliminator wheel having radial, circumferentially spaced plates which intercept the liquid and solid constituents of the spray field and propel them centrifugally outwardly in a thin film for discharge from the periphery of the wheel to a collecting sump. The saturated air or inert gas passes through the spaces between plates of the wheel and may be discharged in the case of air or recycled through cooling condensers and heaters in the case of inert gas.

Referring specifically to FIGURES 2 to 4 of the drawings, there is illustrated a juice concentrating system 18 comprising an elongated casing 25 through which dried and heated inert gas, such as nitrogen is passed at high velocity and low static pressure. The nitrogen is circulated, in this embodiment, in a closed recycling system, including a discharge or moist gas duct 26 connected to an outlet end of the casing 25, first and second cooling condensers 27, 28 connected in series for cooling the moist gas below the dew point to condense water out of the gas and thereby dry the same, and a supply duct 29 extending from the second condenser 28 to an inlet end of the casing 25, having a heater 30 interposed in the duct 29 to heat the gas after it passes through the condensers to increase the moisture absorbing capacity thereof. The casing 25 includes a cylindrical entrance chamber 31 in which a motor driven fan 32 is located to effect forced circulation of the gas through the casing and the remainder of the closed circuit recycling system at the desired velocity. Connected to the cylindrical entrance section 31 is a truncated conical section 33 which diverges in the direction of gas flow, followed by a larger diameter cylindrical section 34 which coacts with the section 33 to form a spray chamber. At the downstream end of the chamber a rotary eliminator chamber is formed by a cylindrical casing section 35 of the same or substantially the same diameter as section 34, which may be separately formed and secured to the latter or integrally formed therewith. The casing section 35 houses a plurality of rotating eliminator wheels arranged in cascade, of a construction to be later described for wringing liquid and solid constituents from the spray field and discharging them centrifugally from the periphery of the eliminator wheels. The cylindrical casing sections 34 and 35 are each provided with a rectangular opening cut into the under portions thereof into which sumps or collecting wells 36, 37 are welded to collect the liquid and solid constituents gravitationally reaching these locations. A branched drain pipe 38 is welded to a bottom opening in the sumps 36 and 37 to drain the liquid and solid juice constituents collected in the sumps into a concentrate surge tank 39 having an outlet conduit 40 connected by a T-fitting to a valved recycling or return conduit 41 and an outlet conduit 42 controlled by a suitable valve 43. The return conduit 41 connects to a supply conduit 44 having a valved inlet 45 for injection of fresh juice to be concentrated and a circulating pressure pump 46 to feed the juice under pressure through the conduit 44 to a spray header assembly 47 located in the sections 33 and 34 of the casing 25.

The spray header assembly 47 in the illustrated embodiment comprises an elongated spray header tube 48 extending centrally and substantially horizontally or along the axis of gas flow in the casing 25, which is closed at both ends and has a diameter which is substantially uniform throughout its length corresponding approximately to the diameter of the hub portion of fan 32. A serial array of radially projecting nozzle tubes 49 extend from the header tube 48 to various distances from the header tube, which, for example, may be disposed in a plural turn spiral pattern about the header tube. While only a few of such nozzle tubes are shown in the drawings in a diagrammatic fashion, a large number of such tubes, for example, about 115 to 130, may be used to obtain the most effective and complete spray field providing substantially even fluid density in cross-section and along the gas stream axis within the casing sections 33 and 34. The nozzle tubes 49 terminate in outlet nozzles for discharging the juice delivered under pressure by pump 46 thereto in spray patterns of preferably conical configuration to substantially fill the spray zone within the chamber with minute droplets of juice and insure effective surface contact of the droplets with the gas stream. It has been found desirable to direct the nozzles at the ends of the first two upstream banks or spiral turns of nozzle tubes in a downstream direction while the remainder of the nozzles face upstream. The nozzles may be of the type designed to handle about 3 to 4 gallons per minute at about 25 pounds per square inch gage pressure, and have flexible orifices of about ¼-inch diameter as is typical in the air conditioning trade.

The rotating eliminator assembly disposed at the downstream end of the casing, is indicated generally by the reference character 50 and in this embodiment comprises a cascade arrangement of three eliminator wheels 51, 52 and 53 arranged about a common axis preferably aligned with the center axis of the casing. In general, the rotor element or wheel of each eliminator stage is composed of an assembly of blades or narrow plates which are essentially planar throughout their area and extend outwardly from a rotatable hub to which they are secured. The blades can be located in planes parallel to the axis of rotation or they can be located in planes at an acute angle to the rotational axis, the former being the arrangement employed in the preferred embodiment.

The air or gas stream entering the zone occupied by the rotary eliminators, together with the minute droplets of liquid and solid constituents of the juice from the spray field, enter the channels formed between the adjacent straight blades of each of the rotating eliminator wheels and are caused to move in a helical path as the gas and droplets travel from one end of the eliminator zone to the other. The pitch of the helical path taken by the gaseous, liquid and solid matter will be determined by the velocity of the gas being circulated through the system and by the rotational speed of the eliminator wheels. Each increment of gas entering a channel or space between the adjacent blades of any one of the eliminator wheels will be rotated through a determinable angle before exiting. The rotary displacement of the channel causes any liquid or solid particles entrained with the gas to move by virtue of its own inertia toward the trailing or downstream end of the eliminator zone. During the time the liquid and solid laden gas is enclosed between the blades or plates of an eliminator wheel, it is rotated at reasonably high speed and each particle of matter having a mass is propelled by centrifugal force toward the periphery of the eliminator wheel. In addition to this centrifugal separation of liquid and solid from the gas, there also exists a collateral scrubbing action between the radial blades or plates which helps to film the liquid out upon the eliminator blades so that it can come up to rotational speed quickly.

Each of the cascaded eliminator wheels 51, 52 and 53 of the preferred embodiment are mounted for rotation on a common shaft 54, journaled in suitable bearings, for example 55 and 55', mounted on suitable spiders or support members extending to the walls of the casing 25, and driven by a suitable drive connection such as the belt and pulley drive 56 from an externally mounted electric motor 57. Each of the rotator wheels are formed essentially of a hub 58 and a plurality of radially extending flat plates or blades 59, 60, illustrated more clearly in FIGURE 3, which may take the form of long plates 59 connected by piano hinge formations 61 at their innermost ends to the hub 58 and preferably held in spaced relation near the radially outer portions of the plates by rubber spacers 62. Disposed between each successive pair of the long plates 59 is a short plate 60 having its outer end circumferentially alined with the outer end of the long plates 59 and terminating at its inner end at a position spaced outwardly from the hub 58, the short plates 60 being supported from the long flanking plates 59 by the outer spacers 62 and by inner spacers 62'. The construction of the eliminator wheels and the manner of mounting of the plates on the hubs may be like that disclosed in copending application S.N. 169,432 filed by James F. King, Jr., and Agnew H. Baunson, Jr.

While the three eliminator wheels 51, 52 and 53 may be driven by independent motors associated with each wheel through a chain and sprocket drive as disclosed in said earlier application, a preferred form of drive mechanism for driving the three eliminator wheels from the single motor 57 is illustrated in FIGURE 4 wherein the upstream wheel 51 and downstream wheel 53 are each directly driven from the common shaft 54 by keying the hub thereof to the shaft 54. The intermediate eliminator wheel 52 is freely journaled on the shaft 54 and has a gear 64 fixed to the hub of eliminator wheel 52 intermeshed with the teeth of a pinion 65 on a pinion shaft 66 journaled in the hub of eliminator wheel 53 in eccentric relation with the axis of shaft 54. The end of pinion shaft 66 at the opposite or downstream end of wheel 53 also carries a pinion 67 which is meshed with a stationary drive gear 68 freely journaled on common shaft 54 to properly align the same but held against rotation by a suitable connection to some stationary member, such as the spider or supporting frame 55a for bearing 55. In one satisfactory example, the eliminator wheels 51 and 52 have 125 blades each, the downstream blade 53 has 250 blades, the wheels 51 and 53 are driven at an angular velocity of 130 r.p.m., and the gear 64 and pinion 67 are provided with 48 teeth while the gear 68 and pinion 65 are provided with 42 teeth to drive the intermediate wheel 52 at about 34 r.p.m. Such an arrangement has been found to produce rapid and effective liquid extraction and rapid saturation of the gas entering the spray field, with a gas circulation rate of about 50,000 c.f.m., a gas velocity of about 1500–2000 f.p.m., for example about 1500 f.p.m., and a liquid injection rate of about 500 gallons per minute, with 115–130 nozzles having orifices of ¼-inch diameter, and producing spray droplets in the range of about 5 microns to 100 microns diameter. It will be appreciated, of course, that other drive arrangements and other specific locations, orientations and configurations of the blades or eliminator wheels than those specifically described may be employed to achieve effective centrifugal discharge of the liquid and solid constituents entrained with the gas stream for recovery of the juice concentrate. The herein described arrangement, however, permits attainment of a saturation efficiency of about 95%, permitting rapid concentration of the juice at a commercially acceptable rate.

In the practice of the method of juice concentration using the above-described apparatus fresh juice is prepared for concentrating by the conventional system as described in connection with the flow sheet of FIGURE 1 up to the introduction of the juice to the juice concentrator stage 18. Just prior to injecting fresh single strength (about 10 to 14 percent soluble solids) juice, the system illustrated in FIGURE 2 is vacuumized, and in the herein described embodiment is filled with an inert gas such as gaseous nitrogen to a pressure slightly greater than atmospheric pressure, for example, about 1.1 atmospheres. The purpose of establishing such a pressure level is to insure that any purging or leakage that occurs will be to the exterior of the system and thus prevent infiltration of oxygen into the system. The circulation of the gaseous nitrogen through the closed circuit system is started by turning on the fan 32 and energizing the motor 57 to drive the rotary eliminator wheels 51, 52 and 53. The condensers 27 and 28, which may for example have heat exchanger coils supplied with liquid nitrogen, are set to cool the moist gas to just below the dew point for drying out the gas. The circulating pressure pump 46 is then started up and fresh juice, derived for example from the finisher 17, is injected into the system through the supply conduit 45 with the valve therein open and the valve in the return conduit 41 closed. The juice is then discharged in a spray pattern through the header 48 and nozzles 49 and dewatered by evaporation of water into the gaseous nitrogen stream and centrifugal discharge of the liquid and solid constituents by the eliminator wheel blades into the sumps to gravitationally collect in the concentrate surge tank 39 until the latter is full. Then the valve in the conduit 41 is opened and the valve in the supply conduit 45 is closed, and the concentrate is recirculated through the pressure pump 46 and spray nozzles 49 until the concentrate reaches the desired Brix—probably about 42° in the case of orange juice and higher with grape or apple juice. Upon attainment of the desired Brix, the concentrate is then withdrawn through the outlet 42 by opening of the valve 43, to pass the concentrate on to the sludge freezer 19. It will be appreciated that the concentration of the orange juice may be effected in plural stages, under which circumstances the concentrate in the surge tank 39 would be withdrawn when a selected Brix level is attained for transfer to a second or additional like concentrating system for successive processing until the desired final Brix is reached. The herein above described system may be used as a single stage concentrator for continuous operation, if desired, in which event fresh juice would be introduced in the system during recirculation of juice through the pump 46, nozzles 49 and eliminator assembly at such a rate that the juice in the surge tank 39 is kept at the desired concentration. Continuous operation may also be effected by feeding the concentrate in the surge tank 39 to a second like concentrating system as referred to above when the concentrate reaches a selected level of concentration.

Instead of employing an inert atmosphere moving in a high velocity stream into which water constituents of the juice are evaporated, the juice may be concentrated by the use of dry air with the apparatus illustrated in FIGURE 5. The apparatus of FIGURE 5 is in most respects like that of FIGURE 2, except that instead of providing the ducting, condensers and heater for the gaseous nitrogen, the inlet to the concentrating apparatus constitutes a mere intake for air from any available source, such as the opening to ambient air or to room air in a plant. In the apparatus illustrated in FIGURE 5, those components which correspond to parts of the apparatus shown in FIGURE 2 are designated by corresponding reference characters. As shown in FIGURE 5, the cylindrical inlet section 31 of the casing 25, which houses the fan 32, is connected at its upstream end to an intake duct formation 70, here shown as a branched intake having a pair of oppositely opening intake transitions 71 and 72 open to ambient air and having suitable conventional desiccant and filter means 73, 74 for drying the inlet air and filtering foreign matter therefrom to supply dry clean air to the fan 32. The rotary eliminator wheel assembly 50, the casing 25, and the fluid circulating loop formed by the surge tank 39, return conduit 41, outlet 42, supply conduit 45, conduit 44 and pressure pump 46, and the spray header 48 having nozzle extensions 49 are the same as their counterparts in the FIGURE 2 form.

In the system of FIGURE 5, juice is prepared for concentrating through the finishing stage 17 in the same manner as for the first described system, and single strength juice having about 10 to 14% soluble solids is supplied to the supply conduit 45. Preferably the juice to be supplied is heated in a heat exchanger (not shown) to between 145° and 175° for two seconds or longer on its way to the spray header 48 and nozzles 49 to inactivate the pectin enzymes which influence juice stability. The fan 32 draws air through either or both of the inlet transitions 71, 72, which dehumidified air is then forced through the casing 25 by the fan 32, where it is humidified in the spray field by evaporation of water constituents from the juice droplets and passes through the eliminator wheel assembly and out of the casing and building through the downstream casing outlet. The juice concentrate formed by the liquid and solid constituents of the spray centrifugally extracted by the eliminator wheels 51, 52 and 53 pass down to the surge tank 39, where the concentrate may be recirculated through the pressure pump 46 to further concentrate the same or it can be passed through the outlet 42 to a second stage corresponding to the stage shown in FIGURE 5.

If single stage operation is used in continuous operation mode, single strength juice (12° Brix juice) may be circulated through the pressure pump 46 until the surge tank 39 is full after which the juice in the surge tank is recirculated through the return conduit 41 and pump 46 until the juice reaches a desired Brix, for example 42° Brix. Then the valve 43 may be manipulated to begin pulling off juice at 42° Brix from the tank 39 through the outlet 42 to the slush freezer 19, while at the same time fresh juice at 12° Brix is being introduced through the supply conduit 45 at a rate that will keep the juice in surge tank 39 at the same level of concentration.

By the systems of FIGURES 2 and 5 described above, rapid concentration of juice in a highly efficient manner can be achieved with minimal loss of natural oils, esters and other constituents that tend to add the distinguishing flavor to natural juice, as the concentration is effected at such low temperatures, for example at substantially room temperature or below, so that the volatile constituents which contribute the desired flavor and aroma are not lost. The highly effective evaporating and liquid and solid constituent recovering apparatus permits rapid concentration in a manner which particularly lends itself to commercial juice concentration installations.

While two preferred embodiments of the present invention have been particularly shown and described, it is apparent that further modifications may be made therein within the spirit and scope of the invention, and it is desired, therefore, that only such limitations be placed on the invention as are imposed by the prior art and set forth in the appended claims.

What is claimed is:

1. In apparatus for concentrating liquid fruit juice having soluble solids therein, a gaseous medium circulating system including a casing having an intake opening and an outlet opening defining an enclosure, a fan mounted adjacent said intake opening to force a gaseous stream through said casing along the direction of the longitudinal axis thereof, spray header means at a relatively upstream location within said enclosure for spraying liquid fruit juice in a spray pattern having substantially uniform density transversely and longitudinally of the enclosure in the form of minute droplets to effect evaporation of water constituents therefrom into the gaseous stream to substantially saturate the latter, a rotary eliminator disposed at a relatively downstream location within said casing including a plurality of blades radially disposed with respect to the axis of rotation, each blade comprising solely a planar surface (extending parallel to the axis of rotation) exposed to the gaseous stream and angularly spaced around the eliminator to pass gaseous medium therethrough while propelling liquid and solid constituents carried downstream from the spray zone circumferentially outwardly beyond the periphery of said eliminator, and collecting sump means in a lower zone of said casing to collect the liquid and solid juice constituents propelled beyond the eliminator periphery as juice concentrate.

2. In apparatus for concentrating liquid fruit juice having soluble solids therein, a closed loop gaseous medium circulating system including a casing having an intake opening and an outlet opening defining an enclosure, means for supplying dried gaseous medium to said intake opening, a fan mounted adjacent said intake opening to force a gaseous stream through said casing along the direction of the longitudinal axis thereof, spray header means at a relatively upstream location within said enclosure for spraying liquid fruit juice in a spray pattern having substantially uniform density transversely and longitudinally of the enclosure in the form of minute droplets to effect evaporation of water constituents therefrom into the gaseous stream to substantially saturate the latter, a rotary eliminator disposed at a relatively downstream location within said casing including a plurality of coaxial eliminator wheels each having plural blades radially disposed with respect to the axis of rotation, each blade comprising solely a planar surface extending coplanar with the axis of rotation exposed to the gaseous stream and angularly spaced around the eliminator, defining channels in the configuration of outwardly opening cylindrical sectors to pass gaseous medium therethrough while pro- the periphery of said eliminator, and collecting sump pelling liquid and solid constituents carried downstream from the spray zone circumferentially outwardly beyond means in a lower zone of said casing to collect the liquid and solid juice constituents propelled beyond the eliminator periphery as juice concentrate.

3. In apparatus for concentrating liquid fruit juice having soluble solids therein, a gaseous medium circulating system including a casing having an intake opening and an outlet opening defining an enclosure, air intake means communicating with said intake opening and with ambient air having dehumidifying means therein for supplying dehumidified air to said intake opening, a fan mounted adjacent said intake opening to force a stream of dehumidified air through said casing along the direction of the longitudinal axis thereof, spray header means at a relatively upstream location within said enclosure for spraying liquid fruit juice in a spray pattern having substantially uniform density transversely and longitudinally of the enclosure in the form of minute droplets to effect evaporation of water constituents therefrom into the air stream to substantially saturate the latter, a rotary eliminator disposed at a relatively downstream location within said casing including a plurality of blades radially disposed with respect to the axis of rotation, each blade comprising solely a planar surface extending coplanar with the axis of rotation exposed to the air stream and angularly spaced around the eliminator to pass air therethrough while propelling liquid and solid constituents carried downstream from the spray zone circumferentially outwardly beyond the periphery of said eliminator, and collecting sump means in a lower zone of said casing to collect the liquid and solid juice constituents propelled beyond the eliminator periphery as juice concentrate.

4. In apparatus for concentrating liquid fruit juice having soluble solids therein, a closed loop gaseous medium circulating system including a casing having an intake opening and an outlet opening defining an enclosure, said circulating system including a return loop connecting said outlet opening with said intake opening externally of said casing having means for introducing inert gas therein and condensing means for condensing water vapor out of the gas and heating means for increasing the water vapor absorbing capacity of the gas, a fan mounted adjacent said intake opening to force a stream of the inert gas through said casing along the direction of the longitudinal axis thereof, spray header means at a relatively upstream location within said enclosure for spraying liquid fruit juice in a spray pattern having substantially uniform density transversely and longitudinally of the enclosure in the form of minute droplets to effect evaporation of water constituents therefrom into the gaseous stream to substantially saturate the latter, a rotary eliminator disposed at a relatively downstream location within said casing including a plurality of coaxial eliminator wheels each having plural blades radially disposed with respect to the axis of rotation, each blade comprising solely a planar surface extending coplanar with the axis of rotation exposed to the stream of inert gas and entrained liquid and solid constituents emanating from the spray zone and angularly spaced around the eliminator to pass the inert gas therethrough while propelling liquid and solid constituents carried downstream from the spray zone circumferentially outwardly beyond the periphery of said eliminator, and collecting sump means in a lower zone of said casing to collect the liquid and solid juice constituents propelled beyond the eliminator periphery as juice concentrate.

5. In apparatus for concentrating liquid fruit juice having soluble solids therein, a closed loop circulating system for gaseous nitrogen including a casing having an intake opening and an outlet opening defining an enclosure, return conduit means for conveying gaseous nitrogen from said outlet opening externally of the casing to said intake opening, condenser means in said return conduit means for reducing the temperature of the gaseous nitrogen below the dew point to condense out water vapor therefrom and thereby dry the same, heat exchanger means in said return conduit means to heat the dried gaseous nitrogen to increase the water vapor absorbing capacity thereof, a fan mounted adjacent to said intake opening to force stream of the dried gaseous nitrogen through said casing along the direction of the longitudinal axis thereof, spray header means at a relatively upstream location within said enclosure for spraying liquid fruit juice in a spray pattern having substantially uniform density transversely and longitudinally of the enclosure in the form of minute droplets to effect evaporation of water constituents therefrom into the gaseous nitrogen to substantially saturate the latter, a rotary eliminator disposed at a relatively downstream location within said casing including a plurality of blades radially disposed with respect to the axis of rotation, each blade comprising solely a planar surface extending coplanar with the axis of rotation exposed to the gaseous nitrogen and angularly spaced around the eliminator to pass gaseous nitrogen therethrough while propelling liquid and solid constituents carried downstream from the spray zone circumferentially outwardly beyond the periphery of said eliminator, collecting sump means in a lower zone of said casing to collect the liquid and solid juice constituents propelled beyond the eliminator periphery as juice concentrate.

6. In apparatus for concentrating liquid fruit juice having soluble solids therein, a closed loop circulating system for gaseous nitrogen including a casing having an intake opening and an outlet opening defining an enclosure, return conduit means for conveying gaseous nitrogen from said outlet opening externally of the casing to said intake opening, condenser means in said return conduit means for reducing the temperature of the gaseous nitrogen below the dew point to condense out water vapor therefrom and thereby dry the same, heat exchanger means in said return conduit means to heat the dried gaseous nitrogen to increase the water vapor absorbing capacity thereof, a fan mounted adjacent said intake opening to force a stream of the dried gaseous nitrogen through said casing along the direction of the longitudinal axis thereof, spray header means at a relatively upstream location within said enclosure for spraying liquid fruit juice in a spray pattern having substantially uniform density transversely and longitudinally of the enclosure in the form of minute droplets to effect evaporation of water constituents therefrom into the gaseous nitrogen to substantially saturate the latter, a rotary eliminator disposed at a relatively downstream location within said casing including a plurality of blades radially disposed with respect to the axis of rotation, each blade comprising solely a planar surface extending coplanar with the axis of rotation exposed to the gaseous nitrogen and angularly spaced around the eliminator to pass gaseous nitrogen therethrough while propelling liquid and solid constituents carried downstream from the spray zone circumferentially outwardly beyond the periphery of said eliminator, collecting sump means in a lower zone of said casing to collect the liquid and solid juice constituents propelled beyond the eliminator periphery as juice concentrate, and valved return conduit means connecting said sump means with spray header means for selectively recirculating the collected constituents to said spray header means until a desired Brix is attained.

7. The structure of claim 1, wherein said planar surface of said blade is coplanar with the axis of rotation.

References Cited

UNITED STATES PATENTS

| | | | |
|---|---|---|---|
| 986,365 | 3/1911 | Corliss | 159—4 |
| 997,502 | 7/1911 | Kestner | 159—45 |
| 999,972 | 8/1911 | Ekenberg | 159—4 |
| 1,057,613 | 4/1913 | Baldwin. | |
| 1,223,083 | 4/1917 | Lynn | 159—4 |
| 1,512,776 | 10/1924 | Lough | 159—4 |
| 1,497,201 | 6/1924 | Wheat | 159—4 |
| 1,794,978 | 3/1931 | Pease | 159—48 |
| 1,817,349 | 8/1931 | Clark | 159—48 |
| 2,887,380 | 5/1959 | Coulter et al. | 99—199 |
| 2,932,360 | 4/1960 | Hungate | 55—257 X |
| 2,962,116 | 11/1960 | Hayes et al. | 55—404 X |
| 2,998,059 | 8/1961 | Johnson | 159—4 |

FOREIGN PATENTS

| | | |
|---|---|---|
| 15,231 | 9/1929 | Australia. |
| 544,215 | 9/1922 | France. |
| 904,260 | 2/1954 | Germany. |

NORMAN YUDKOFF, *Primary Examiner.*

J. SOFER, *Assistant Examiner.*